(12) United States Patent
Kikuchi et al.

(10) Patent No.: US 7,035,216 B2
(45) Date of Patent: Apr. 25, 2006

(54) CONGESTION CONTROL UNIT

(75) Inventors: Yukihiro Kikuchi, Kawasaki (JP); Syuji Takada, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 09/981,095

(22) Filed: Oct. 16, 2001

(65) Prior Publication Data

US 2002/0159388 A1    Oct. 31, 2002

(30) Foreign Application Priority Data

Apr. 27, 2001    (JP) .............................. 2001-133576

(51) Int. Cl.
*H04L 1/00* (2006.01)
(52) U.S. Cl. ................................... 370/235
(58) Field of Classification Search ..... 370/229–235.1, 370/236, 410, 401, 412–418
See application file for complete search history.

(56) References Cited

U.S. PATENT DOCUMENTS

| | | | | |
|---|---|---|---|---|
| 5,295,135 A | * | 3/1994 | Kammerl | 370/233 |
| 5,377,327 A | * | 12/1994 | Jain et al. | 709/235 |
| 5,442,624 A | * | 8/1995 | Bonomi et al. | 370/231 |
| 5,497,375 A | * | 3/1996 | Hluchyj et al. | 370/232 |
| 5,524,006 A | * | 6/1996 | Hluchyj et al. | 370/233 |
| 5,625,622 A | * | 4/1997 | Johri | 370/235.1 |
| 5,629,937 A | * | 5/1997 | Hayter et al. | 370/233 |
| 5,724,099 A | * | 3/1998 | Hamdi et al. | 375/240.05 |
| 6,304,551 B1 | * | 10/2001 | Ramamurthy et al. | 370/232 |
| 6,463,068 B1 | * | 10/2002 | Lin et al. | 370/414 |

FOREIGN PATENT DOCUMENTS

JP    56-123164    9/1981

OTHER PUBLICATIONS

Floyd et al, Random Early Detection Gateways for Congestion Avoidance, downloadable at CiteSeer, pp. 1-22, 1998.*

* cited by examiner

*Primary Examiner*—Frank Duong
(74) *Attorney, Agent, or Firm*—Katten Muchin Rosenman LLP

(57) ABSTRACT

The present invention relates to a packet transfer communication device. More particularly, the present invention relates to a congestion control unit designed to handle communication at high speed by reducing a load of congestion processing conducted in a core router and an edge router. The congestion control unit includes a packet discarding judgment section that conducts congestion control by a packet discarding judgment based on a smooth queue length which is a quantity of accumulated data composed of a difference between a quantity of input data and a quantity of output data at each predetermined period in a smooth queue length calculating section.

4 Claims, 17 Drawing Sheets

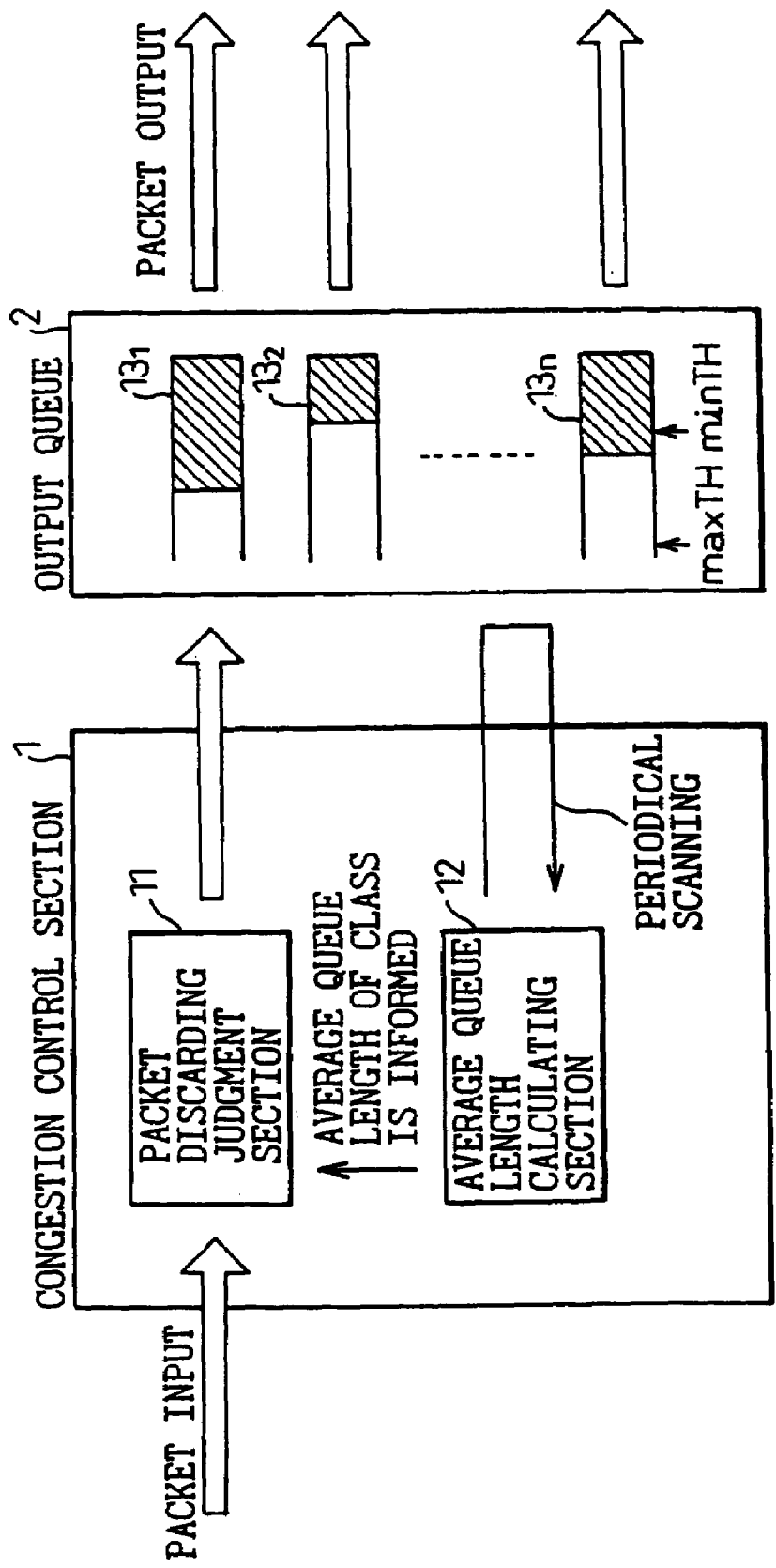

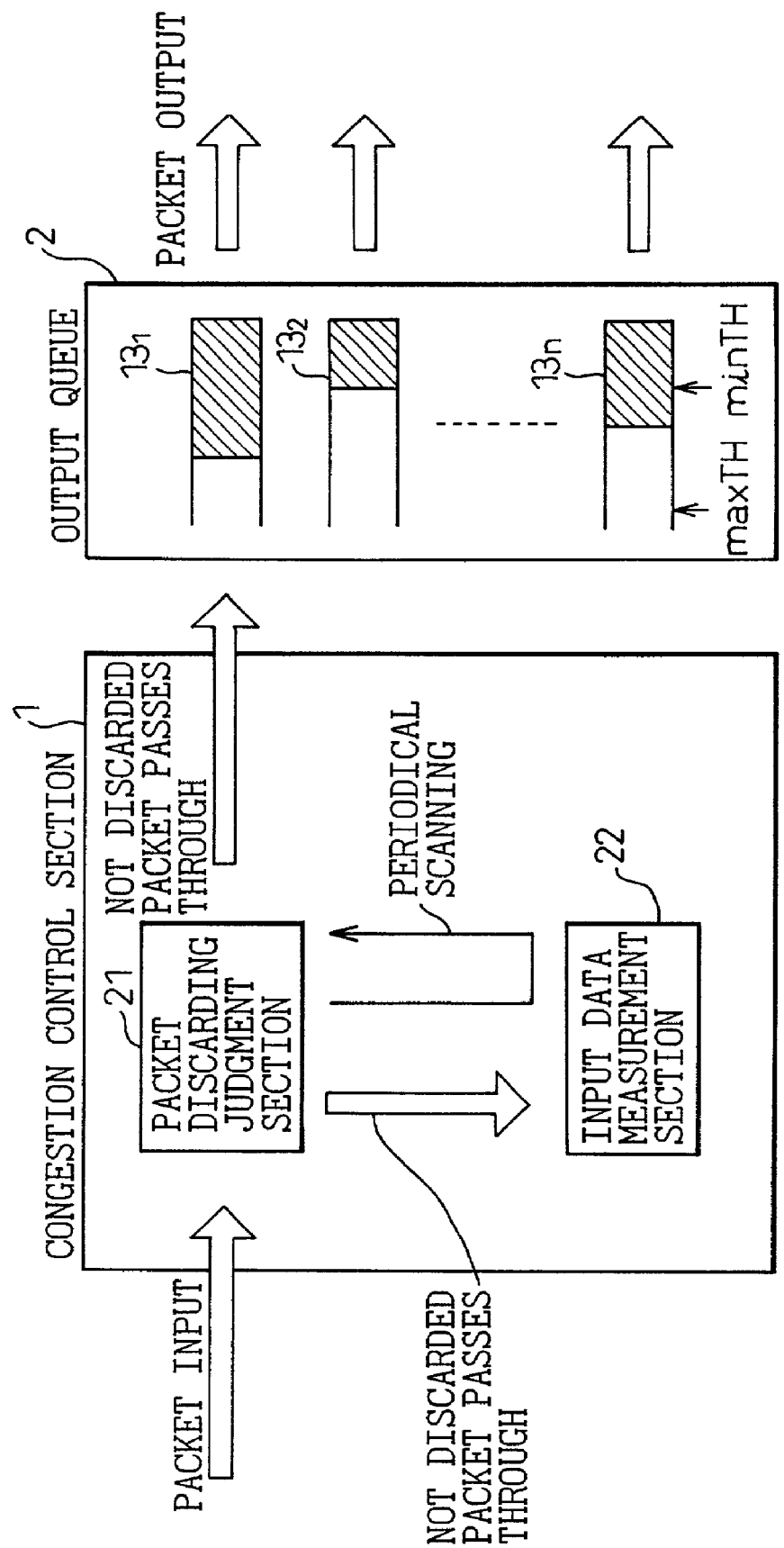

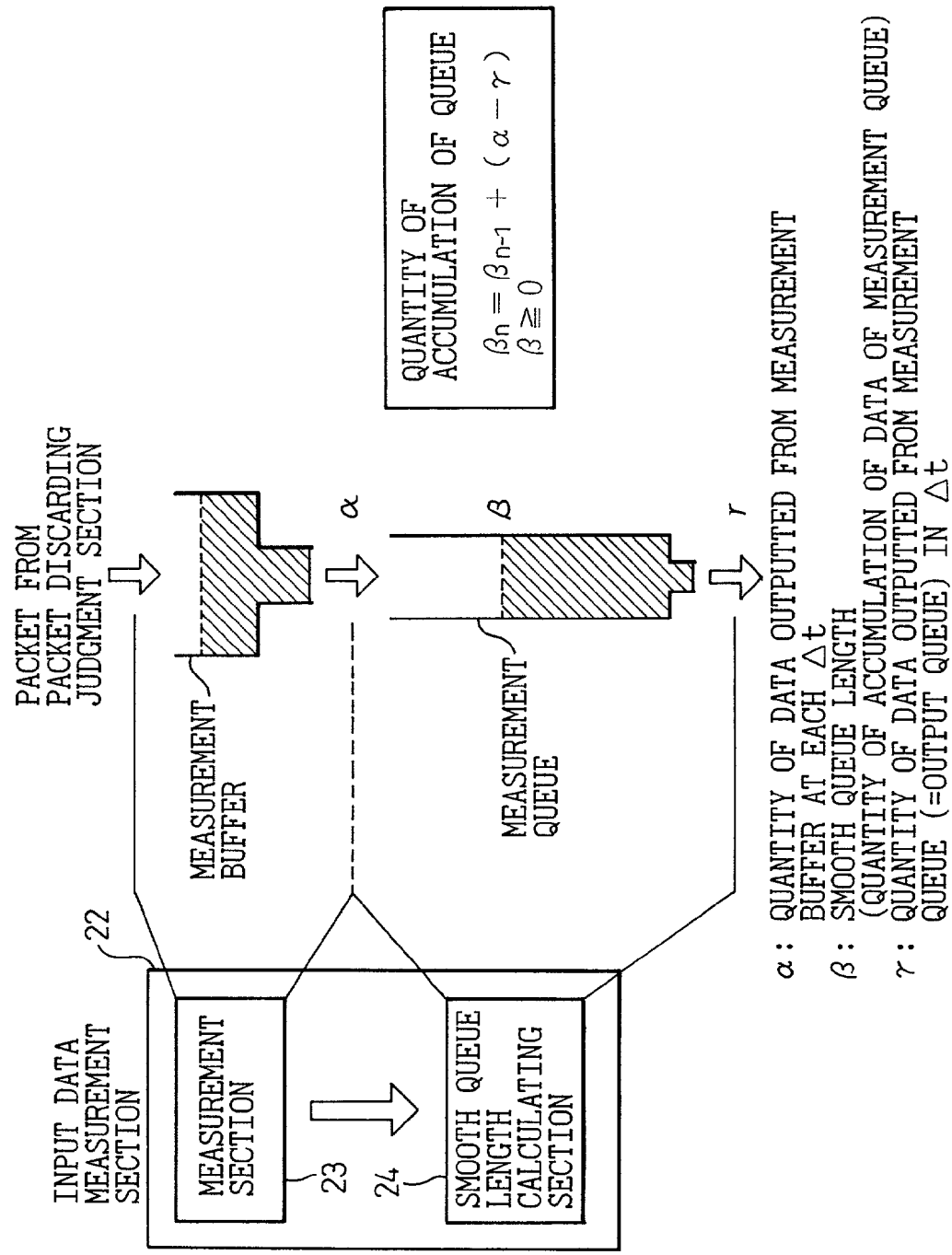

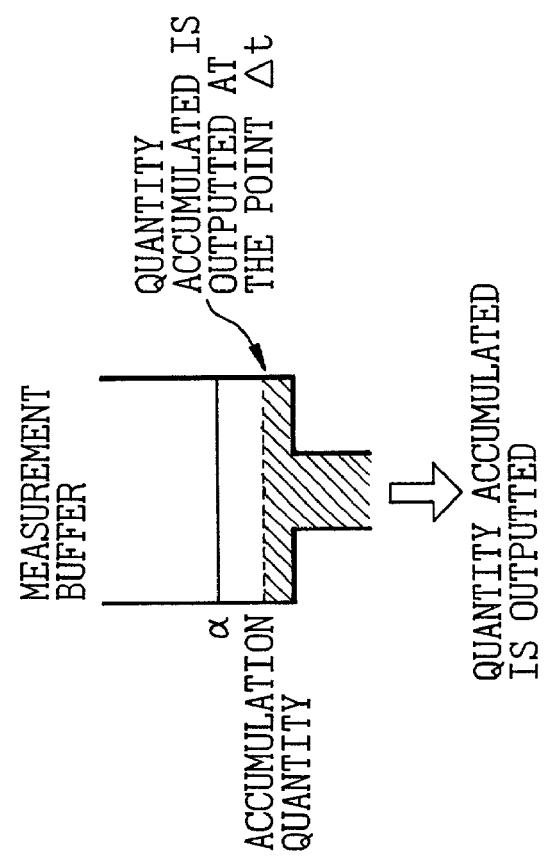
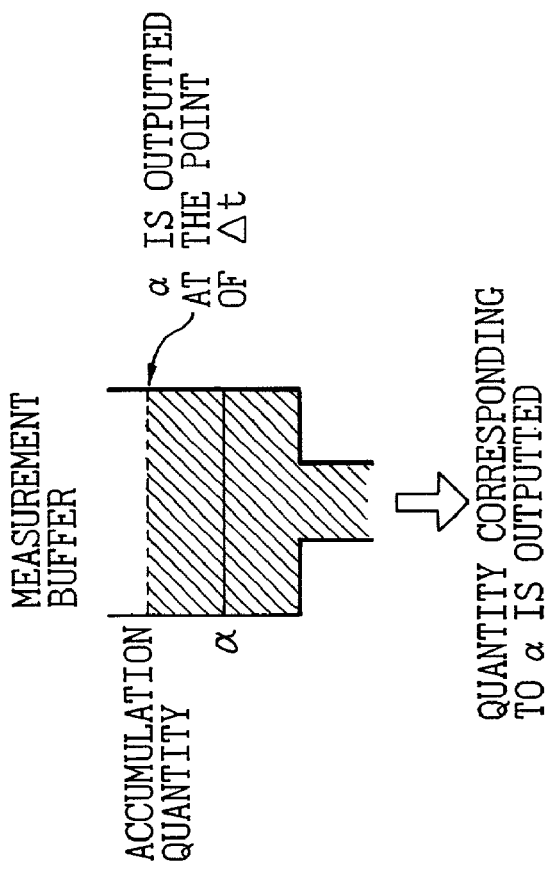

WP : Write Pointer

WP : Write Pointer    RP : Read Pointer

β: SMOOTH QUEUE LENGTH

S: QUANTITY OF ACCUMULATED DATA IN THE MEASUREMENT SECTION
$\alpha$ : QUANTITY OF DATA OUTPUTTED FROM THE MEASUREMENT SECTION AT EACH $\Delta t$ $\beta_{n-1}$: SMOOTH QUEUE LENGTH UP TO THE LAST TIME
$\beta_n$: SMOOTH QUEUE LENGTH OF THE PRESENT TIME
$\alpha$: QUANTITY OF DATA INPUTTED INTO THE SMOOTH QUEUE LENGTH CALCULATING SECTION IN $\Delta t$
$\gamma$: QUANTITY OF DATA OUTPUTTED FROM THE SMOOTH QUEUE LENGTH CALCULATING SECTION IN $\Delta t$

CONGESTION CONTROL UNIT

BACKGROUND OF THE INVENTION

1. Field of the Invention

The present invention relates to a packet transfer communication device. More particularly, the present invention relates to a congestion control unit to conduct a packet discarding disposal in the case of congestion caused in a core router or edge router in communication over the Internet in which variable-length packets are used.

2. Description of the Related Art

Recently, the Internet has spread all over the world, and communication in which variable-length data, such as IP (Internet Protocol) packets, are used has become mainstream. In a conventional Internet service, a best-effort type service, in which quality, such as prevention of delay or guarantee bandwidth, is not guaranteed at all, is mainly provided.

However, recently, new services such as VoIP (Voice over IP), in which voice signals from a telephone are carried by IP packets, and VPN (Virtual Private Network), in which exclusive lines for enterprises can be realized on the Internet, have appeared on the market. Accordingly, a guaranteed QoS (Quality of Service) has become important even on the Internet. Congestion control is one of the functions of QoS.

When the input rate with respect to a node is higher than the output rate of the node, there is a possibility of the occurrence of congestion. In order to solve the problems caused by the congestion, it is common that data packets, which have been inputted in the case of congestion, are discarded under certain conditions. As a result, the quality of data is deteriorated, and it becomes impossible to provide a service in which a predetermined quality is guaranteed. Accordingly, it is important to conduct the congestion control, described above, correctly.

FIG. 1 is a view showing an example of RED (Random Early Discard) which is a typical congestion control method of the prior art.

FIG. 1 is a graph showing a relation between the average queue length (avg: average) and the packet discarding probability (pb: probability) in RED. The average queue length can be found by the following formula (1). In this formula, avg is an average queue length, q is an actual queue length, Wq is a weight coefficient of a queue, and t is the interval of the measurement times.

$$\mathrm{avg}(t) = (1 - Wq) \times \mathrm{avg}(t-1) + Wq \times q \quad (1)$$

In FIG. 1, when the average queue length is not more than the minimum threshold value, the packet discarding probability is "0" (no packets are discard), and when the average queue length is not less than the maximum threshold value, the packet discarding probability is "1" (all packets are discard). In a range between the minimum threshold value and the maximum threshold value, the packet discarding probability (pb) can be found by the following formula (2), and the packets are discarded according to the value found by this formula. In this case, pb is a packet discarding probability, maxp is the maximum probability, minTH is the minimum threshold value, and maxTH is the maximum threshold value.

$$pb = \mathrm{max}P \times (\mathrm{avg} - \mathrm{min}TH) / (\mathrm{max}TH - \mathrm{min}TH) \quad (2)$$

FIG. 2 is a view showing an example of the structure of a common RED function of the prior art.

In the congestion control section 1, the packet discarding judgment section 11 outputs an input packet into each queue $13_1$ to $13_n$ of the output queue 2 which is classified by the priority of QoS or, alternatively, the packet discarding judgment section 11 selects a predetermined number of the input packets of the corresponding class at random according to the packet discarding probability of each class informed from the average queue length calculating section 12, and the thus selected packets are discarded. The output queue 2 preferentially outputs packets in the queue of high priority.

In the average queue length calculating section 12, queues $13_1$ to $13_n$ in each class of the output queue 2 are scanned at a predetermined period, and the actual queue length q of each class is measured and then the average queue length (avg) is found by the formula (1). Then, the packet discarding probability (pb) is found by the formula (2). The packet discarding probability of each class is informed to the packet discarding judgment section 11 as described before.

However, in the congestion control system in which RED is used, it is necessary to conduct calculations by the formulas (1) and (2). Especially, when the average queue length is calculated, it becomes necessary to conduct the calculation of formula (1) at each measurement time interval t. In this case, when the average queue length is calculated, a calculation such as a multiplication, which requires a long processing time, must be repeatedly carried out. Therefore, a very heavy load is given to the congestion control unit. Further, since communication speed has been increased recently, it is necessary for the core router to handle a data rate of several G bpS, and also, it is necessary for the edge router to handle the data rate of several hundred M bpS. Therefore, the period of time which can be allotted to the above calculation tends to be reduced.

SUMMARY OF THE INVENTION

In view of the above problems, it is an object of the present invention to provide a new congestion control unit in which a smooth queue length parameter, according to the present invention, is used instead of the average queue length of RED. Due to the foregoing, the present invention provides a congestion control unit capable of handling a high communication speed by reducing the load when the calculation processing is carried out.

The present invention provides a congestion control unit comprising: an input data measurement section for measuring a quantity of packet data to be inputted and a packet discarding judgment section for conducting a discarding judgment on an arriving packet and outputting a packet not to be discarded into an output queue and the input data measurement section, the input data measurement section including a measurement section for outputting a constant quantity of packet data, which are inputted from the packet discarding judgment section, at a predetermined period and also including a smooth queue length calculating section for accumulating data outputted from the measurement section and outputting a constant quantity of accumulated data in the predetermined period, wherein the packet discarding judgment section conducts congestion control by a packet discarding judgment based on a smooth queue length which is a quantity of accumulated data composed of a difference between a quantity of input data and a quantity of output data at each predetermined period in the smooth queue length calculating section.

The input data measurement section periodically estimates the tendency of an increase in the smooth queue length, in the future, from a quantity of data accumulated in the input data measurement section, informs the packet discarding judgment section of the result of the estimation of the increase of the smooth queue length, and conducts batch processing in a period capable of being estimated, after the period capable of being estimated has passed. The packet discarding judgment section calculates the time, at which the smooth queue length exceeds a threshold value, from a quantity of the future increase in the smooth queue length which has been informed, and judges whether an arriving packet is made to pass or is discarded according to the time.

The packet discarding judgment section judges whether an arriving packet is made to pass or is discarded according to the packet discarding probability in which the smooth queue length is used as a parameter. The smooth queue length calculating section includes a memory device or pointing device for calculating and displaying a quantity of accumulated data composed of a difference between the quantity of input data and the quantity of output data.

BRIEF DESCRIPTION OF THE DRAWINGS

The present invention will be more clearly understood from the description as set forth below with reference to the accompanying drawings.

FIG. 2 is a view showing an example of the structure of the function of RED.

FIG. 3 is a view showing a fundamental structure of the congestion control unit in which the smooth queue length of the present invention is used.

FIG. 4 is a view schematically showing the structural blocks and operations of an input data measurement section.

FIG. 5A is a view showing an example of the operation in the case of "Quantity of accumulation">$\alpha$.

FIG. 5B is a view showing an example of the operation in the case of "Quantity of accumulation"<$\alpha$.

DESCRIPTION OF THE PREFERRED EMBODIMENTS

Figure 1:
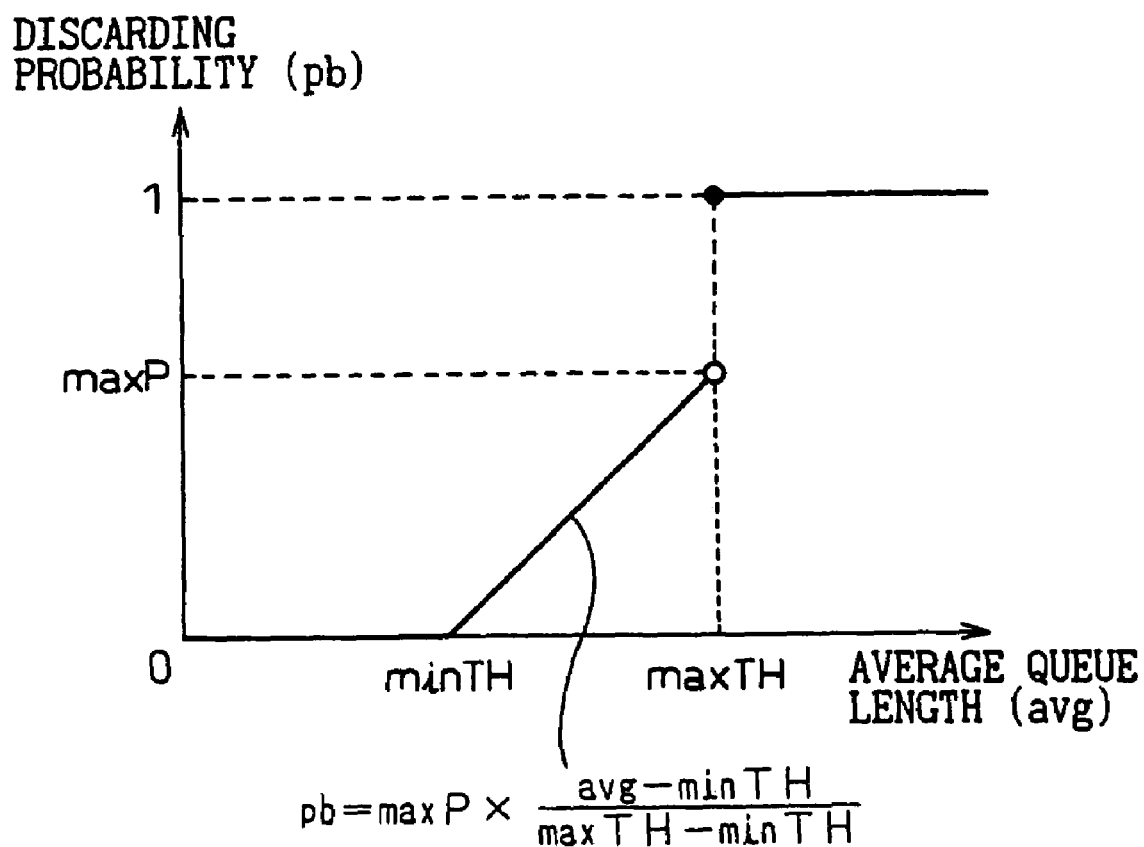
FIG. 1 is a graph showing an example of RED in which the conventional average queue length is used.

FIG. 3 is a view showing a fundamental structure of the congestion control unit in which the smooth queue length of the present invention is used.

In the structure shown in FIG. 3, there is provided an input data measurement section 22 for calculating a smooth queue length of the present invention instead of the conventional average queue length calculating section 12. The input data measurement section 22 calculates a parameter which becomes a judgment criterion in the case of determining the packet discarding probability. Therefore, the input data measurement section 22 measures a quantity of data of input/output packets and detects an average quantity of data accumulated in the output queue.

The packet discarding judgment section 21 operates as follows. The packet discarding judgment section 21 informs the input data measurement section 22 of the packets not to be discarded. Further, the packet discarding judgment section 21 periodically scans the result of calculation of the input data measurement section 22. Concerning the latter, it is possible to compose the structure in such a manner that the result of calculation is informed from the input data measurement section 22.

The fundamental operation of the packet discarding judgment section 21 is the same as that of the conventional example shown in FIG. 2. The input packet is outputted into each classified queue $13_1$ to $13_n$ of the output queue 2. Alternatively, according to the packet discarding probability (pb shown in FIG. 14) in which the smooth queue length sent from the input data measurement section 22 is used, a packet in the corresponding class is selected at random and discarded.

FIGS. 4, 5A and 5B are views schematically showing fundamental blocks composing the input data measurement section 22 and also showing operation of the fundamental blocks.

In FIG. 4, a measurement buffer is arranged in the measurement section 23, and packets not discarded by the packet discarding judgment section 21 are temporarily accumulated in the measurement buffer. Concerning this measurement buffer, a quantity of data outputted at each constant time ($\Delta t$) is fixed to a constant quantity ($\alpha$) irrespective of a quantity of inputted packets.

In order to measure the size of the inputted packet which has passed through the packet discarding judgment section 21 without being discarded, the measurement section 23 accumulates the inputted packet in the measurement buffer. On the other hand, a predetermined quantity $\alpha$ of data is outputted into the smooth queue length calculating section 24 of the next stage at each predetermined time $\Delta t$. As a result, when a quantity of data exceeding the quantity $\alpha$ of data is accumulated in the measurement buffer as shown in FIG. 5A, the quantity $\alpha$ of data is outputted. Even if the quantity of inputted data is extremely increased, the quantity of data to be outputted is a constant value of $\alpha$. On the contrary, when the quantity of data accumulated in the measurement buffer is smaller than the constant value of $\alpha$, the quantity of data accumulated at this time is outputted as it is.

On the other hand, the smooth queue length calculating section 24 is provided with a measurement queue which is arranged inside. Concerning this measurement queue, the quantity of data outputted from it at each constant time (Δt) is fixed to a constant quantity (γ) irrespective of the quantity of the inputted packets. As a result, the quantity (β) of data accumulated in the measurement queue can be found by the following formula (3). In the present invention, the quantity (β) of data accumulated in the measurement queue is referred to as "smooth queue length".

$$\beta_n = \beta_{n-1} + (\alpha - \gamma), \beta \geq 0 \quad (3)$$

In this case, the output rate from each queue $13_1$ to $13_n$ of the output queue 2 can be considered to be constant because a constant bandwidth is guaranteed for each class by the read-out scheduling. Accordingly, the quantity γ of outputted data of the corresponding measurement queue also becomes constant. As a result, the smooth queue length β represents an average of the data accumulation state of each output queue $13_1$ to $13_n$.

As a result, although packets of various sizes are inputted into the congestion control unit, the input data of various sizes are smoothed as the quantity α of data for each Δt by the measurement buffer in the input data measurement section 22. Further, the quantity γ of data is also handled as an averaged constant value. Therefore, this quantity β of data becomes an average accumulation quantity ("average queue length") which is determined by an averaged input and output.

On the other hand, as shown in FIG. 3, it is considered that the same data as that input/output with respect to the input data measurement section 22 are inputted and outputted. Therefore, this quantity β of data represents an average quantity of accumulation of the actual output queue. Accordingly, in the present invention, when the smooth queue length β is used and the packet discarding probability (pb) based on the smooth queue length β described later is used, the packet discarding judgment processing is conducted in the packet discarding judgment section 21.

According to the present invention, instead of the conventional congestion control unit in which the packet discarding judgment is conducted by using a parameter ("average queue length") which is calculated by both the periodical monitoring of the output queue and complicated calculation, the packet discarding judgment can be conducted only by monitoring the smooth queue length of the present invention. Also, it is possible to provide a congestion control unit capable of being installed in the core router in which high speed processing is required.

FIGS. 6 to 10 are views showing a plurality of embodiments of the input data measurement section 22 of the present invention.

Figure 6:
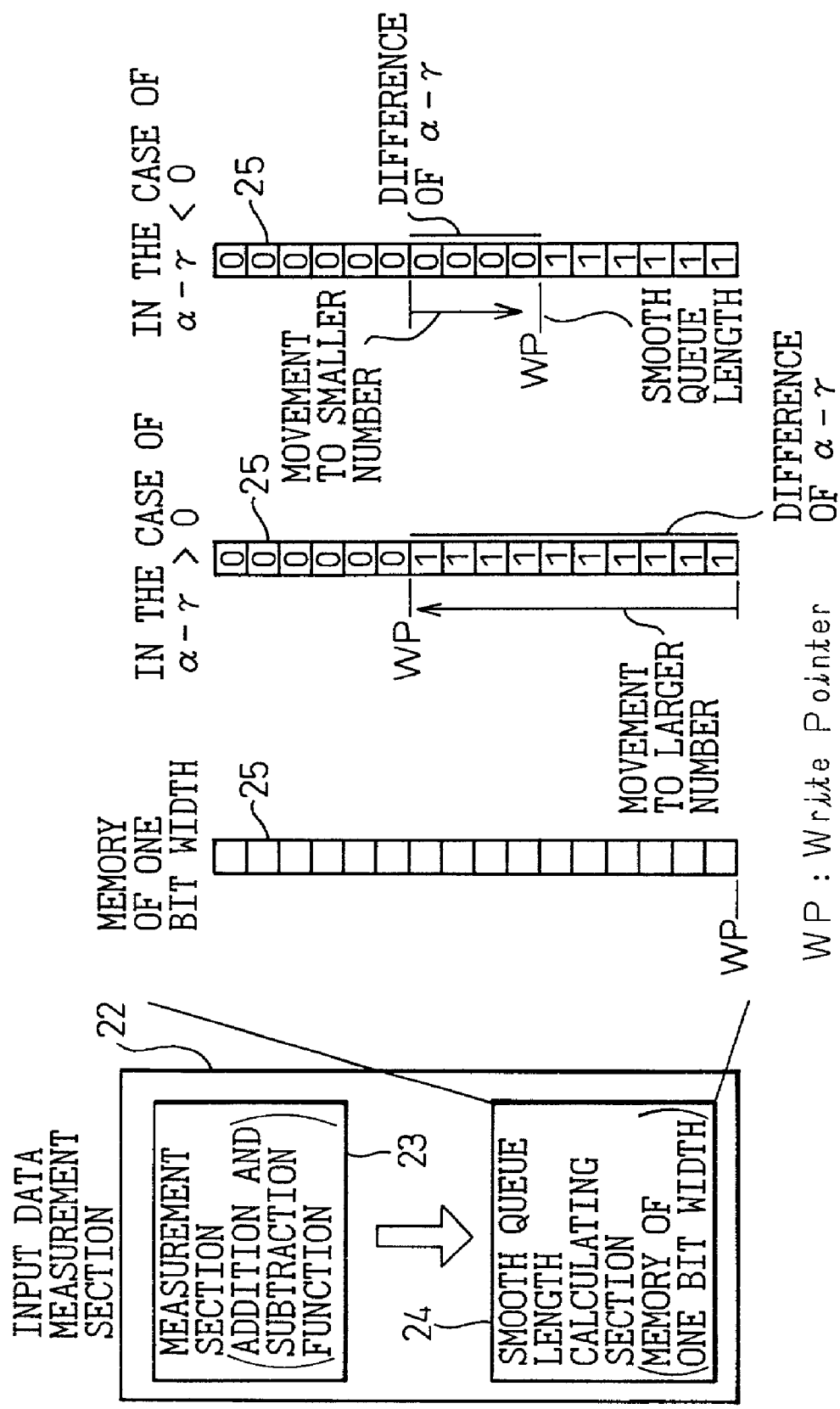
FIG. 6 is a view showing the first embodiment of the input data measurement section.

In the first embodiment shown in FIG. 6, the measurement section 23 of the input data measurement section 22 having an addition and subtraction function conducts addition and subtraction processing in such a manner that a total number of input bytes received in Δt is added to the total of the quantity of accumulated data and, after the time Δt has passed, the quantity of data α is subtracted from it so as to find a new total, and the quantity α of subtraction is informed to the smooth queue length calculating section 24.

The smooth queue length calculating section 24 of the input data measurement section 22 is composed of a plurality of one bit memories 25, and each one bit corresponds to one byte of input data. In this connection, it is possible to make one bit correspond to one packet. However, in this embodiment, one bit is made to correspond to one byte because a variable length packet is the object in this embodiment. WP (write Pointer) directs a memory position (address) corresponding to the number of received bytes accumulated in the measurement queue of FIG. 4.

In this case, in the case of α−γ>0, a quantity of data accumulated for each time of Δt is added to the quantity β of accumulated data, so that WP is increased by the addition. That is, "1" is written in the memory of the data, the quantity of which is increased, and WP is moved to a corresponding position on the larger number side. On the contrary, in the case of α−γ<0, a quantity of data decreased each time Δt is subtracted from the quantity β of accumulated data, so that WP is decreased by the subtraction.

That is, "0" is written in the memory of the data, the quantity of which is decreased, and WP is moved to a corresponding position on the smaller number side. As a result, the position WP represents the average accumulation data quantity $\beta_n$ of the formula (3) as it is, and the value represents a smooth queue length itself of the present invention. The same structure may be realized by FIFO memory or a stack memory instead of the one bit memory 25.

Figure 7:
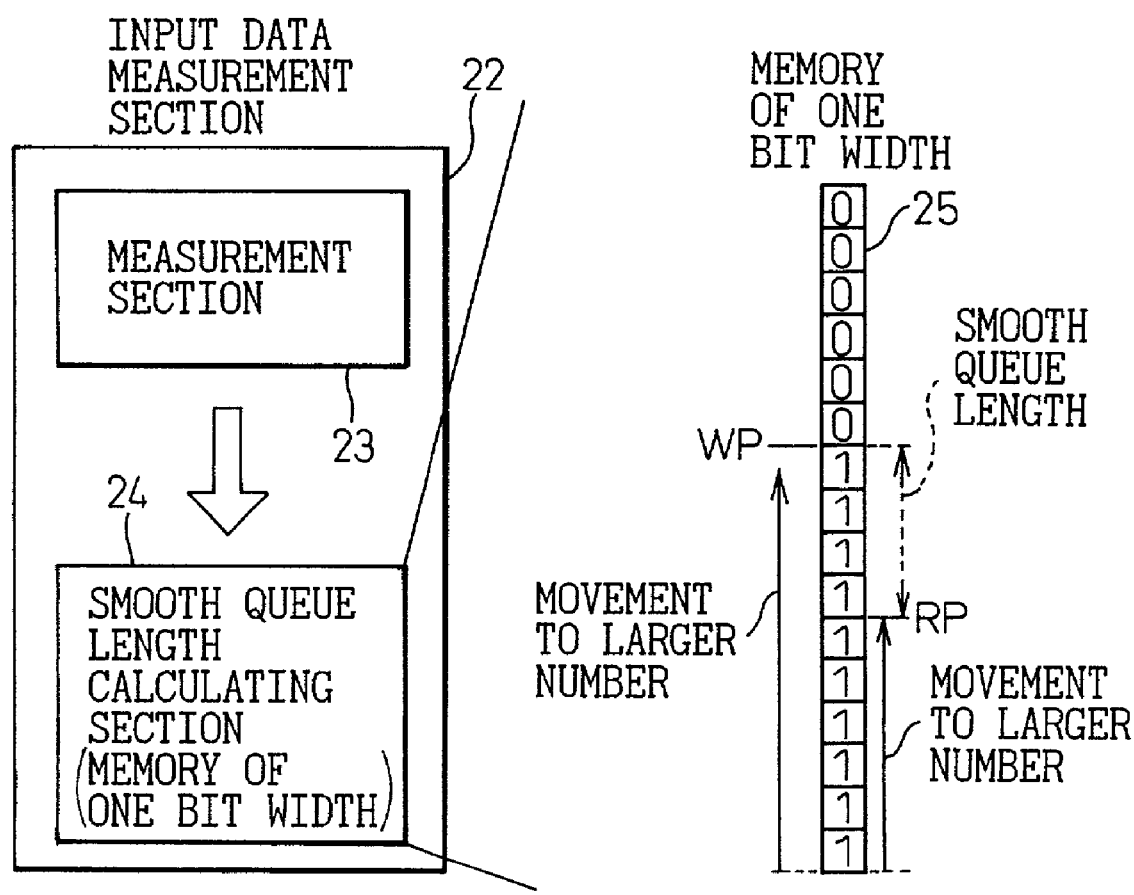
FIG. 7 is a view showing the second embodiment of the input data measurement section.

In the second embodiment shown in FIG. 7, RP (Read Pointer) is used in addition to WP. In the case shown in FIG. 6, depending upon the quantity of received data, it becomes necessary to increase the length of one bit memory. In this embodiment, it is formed into a ring-shape and further WP and RP are jointly used. Due to the foregoing, the length of the one bit memory is decreased to a quantity of one bit memory capable of being allotted for buffering. In this case, operation is conducted in the same manner as that of FIG. 6 except for the control conducted so that RP can not exceed WP. In this case, a difference of WP−RP becomes a smooth queue length.

Figure 8:
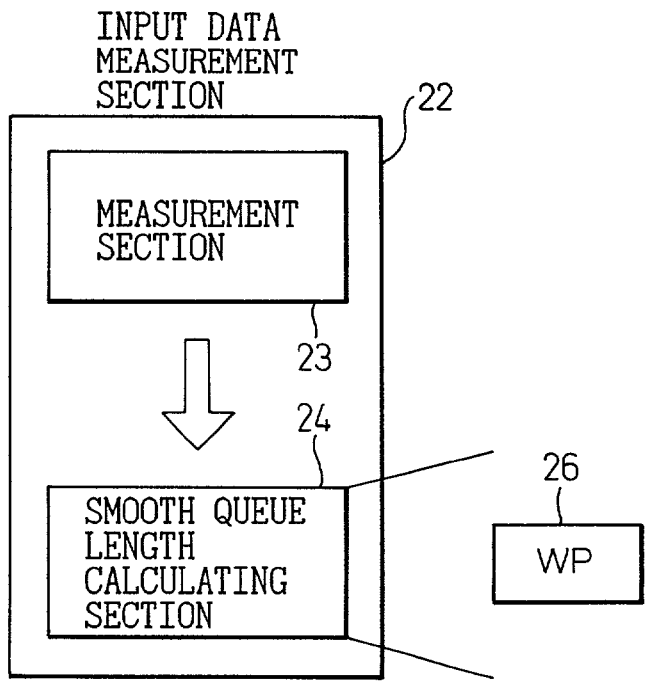
FIG. 8 is a view showing the third embodiment of the input data measurement section.

In the third embodiment shown in FIG. 8, it is considered that one bit memory 25 in FIG. 6 is virtual, and only WP memory 26 for accommodating WP is prepared. In this case, when the quantity α of data is inputted, WP memory 26 is renewed to WP=WP+α, and when the quantity γ of data is outputted, WP memory 26 is renewed to WP=WP−γ. The value of this WP memory 26 becomes a smooth queue length at this time. It is possible to use an up-and-down counter instead of this WP memory 26.

Figure 9:
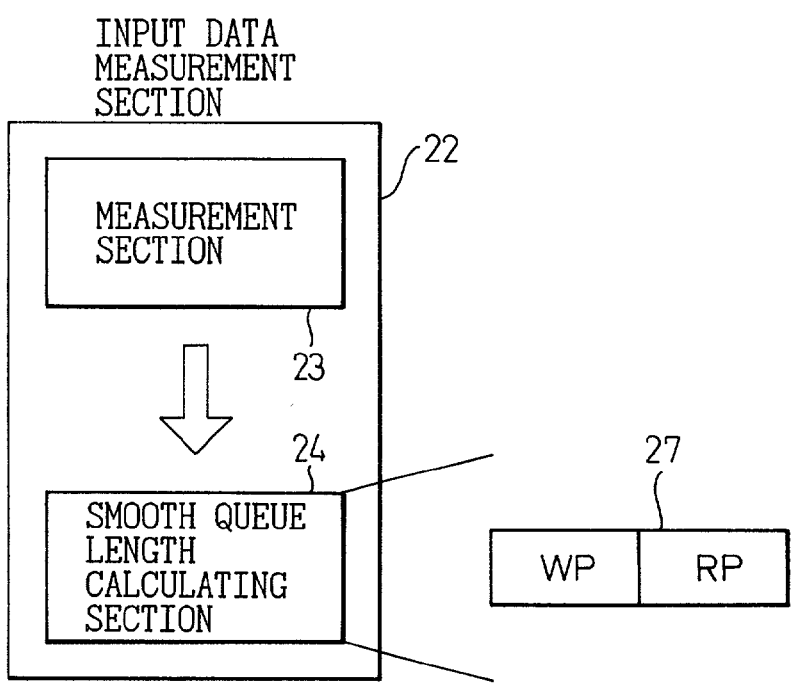
FIG. 9 is a view showing the fourth embodiment of the input data measurement section.

In the fourth embodiment shown in FIG. 9, in the same manner as that described above, it is considered that one bit memory 25 of the ring-shape in FIG. 7 is virtual, and only WP/RP memory 27 for accommodating WP and RP is prepared. In the above case, when the quantity α of data is inputted, WP memory 26 is renewed to WP=WP+α, and when the quantity γ of data is outputted, the value of RP is renewed to RP=RP+γ. A difference between WP and RP becomes a smooth queue length. In this embodiment, a modulo arithmetic of a predetermined number is executed in this embodiment.

Figure 10:
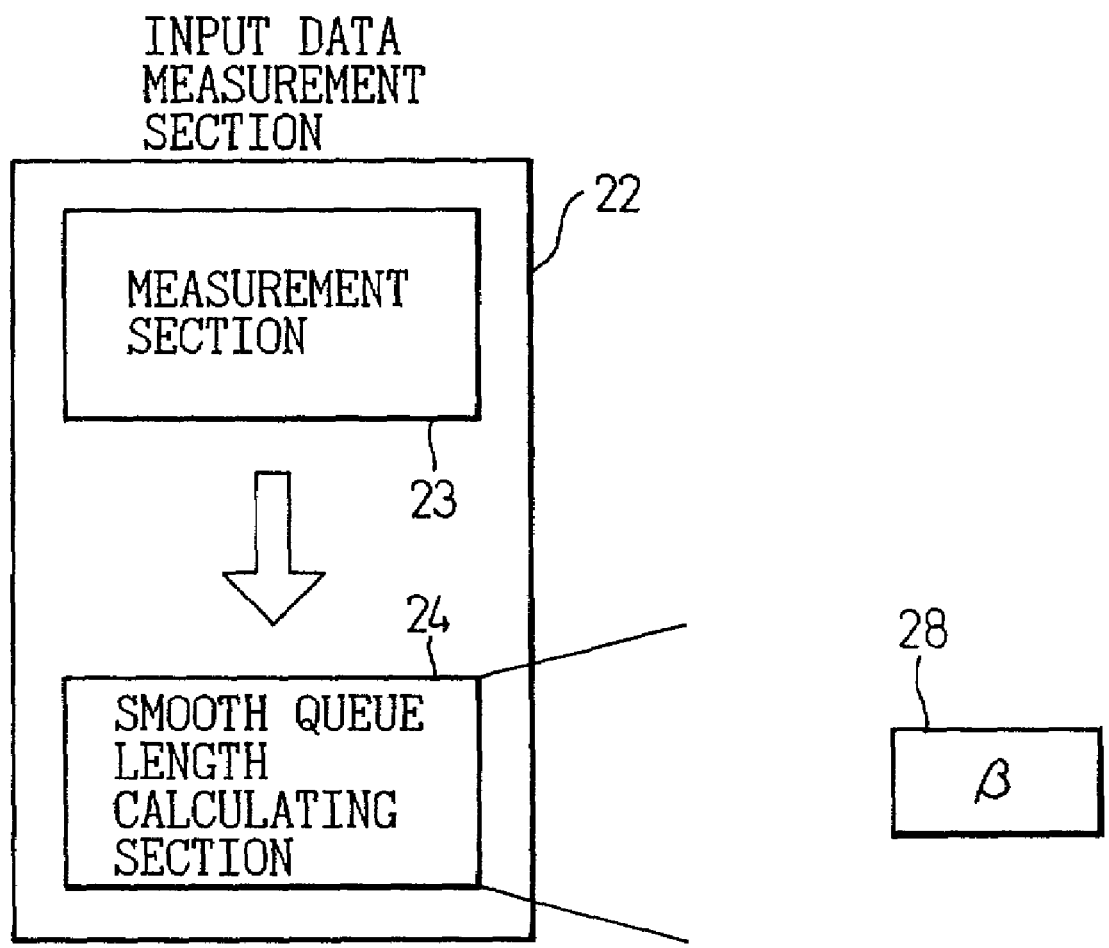
FIG. 10 is a view showing the fifth embodiment of the input data measurement section.

In the fifth embodiment shown in FIG. 10, only the memory 28 for accommodating the smooth queue length calculation result is provided. When the smooth queue length is calculated, the smooth queue length $\beta_{n-1}$ of the last time is taken out from this memory 28 at each Δt, and then $\beta_n = \beta_{n-1} + (\alpha - \gamma)$ is actually calculated with the formula (3) described before, so that the smooth queue length $\beta_n$ at this time is found. Finally, when the calculation result $\beta_n$ is written in the memory 28, the renewal is completed.

Figure 11A:
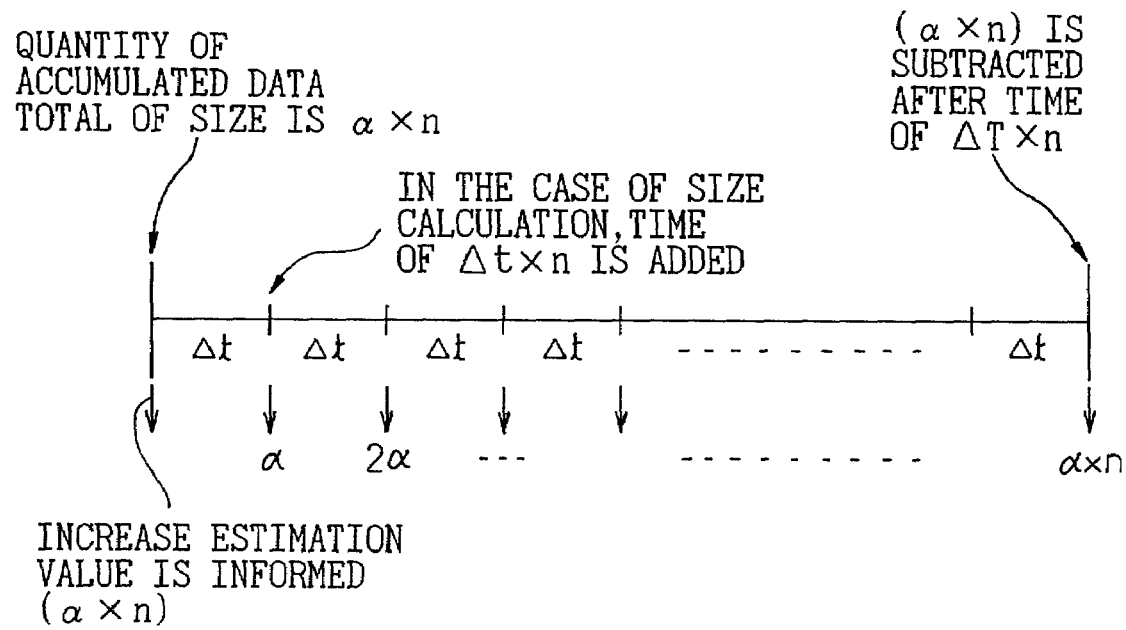
FIG. 11A is a view showing the sixth embodiment in which the estimation of the smooth queue length is used.
Figure 11B:
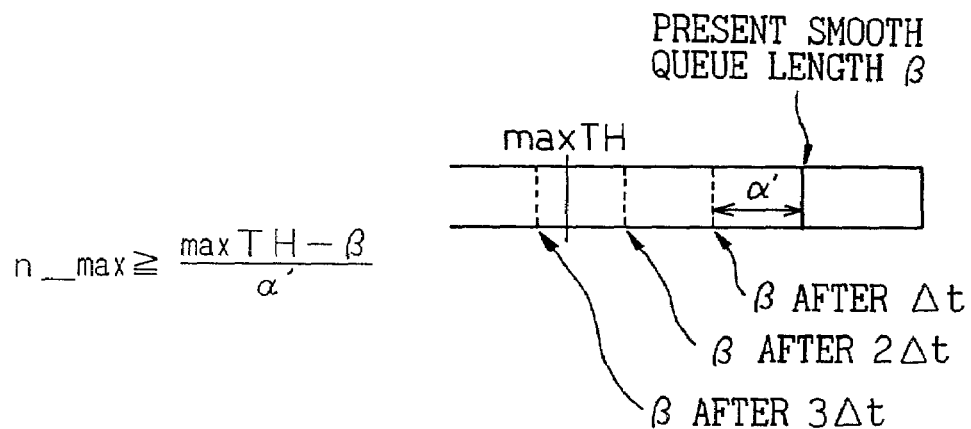
FIG. 11B is a view showing an example of the discarding judgment processing in FIG. 11A.

FIGS. 11A and 11B are views showing the sixth embodiment of the present invention.

In FIG. 11A, on the assumption that a quantity of data of α×n is accumulated in the measurement section 23 of the input data measurement section 22, a quantity of increase α×n of the smooth queue length in the future, which will be referred to as "estimation value of increase", is informed from the input data measurement section 22 to the packet discarding judgment section 21. Concerning this information, the measurement section 23 checks a quantity of accumulation at each Δt and informs an estimation value of increase each time.

In the period of Δt×n after the completion of information, in the measurement section 23, only the addition of the quantity of input data sent from the packet discarding judgment section 21 is conducted, and the quantity of data α is outputted into the smooth queue length calculating section 24 at each Δt, as usual. Accordingly, in the smooth queue length calculating section 24, the quantity of data β is calculated at each Δt, as usual.

In this case, the calculating section 23 does not conduct an α subtraction at each Δt, and the quantity of subtraction α×n in the meantime is subtracted from the total of the data accumulation size after the period of Δt×n. As a result, when an output of the quantity of data α of a continuous predetermined frequency is previously known in the measurement section 23, the load of calculation can be reduced by conducting the batch processing in the meantime.

FIG. 11B is a view showing an example of the processing conducted by the packet discarding judgment section 21 for the estimation processing of the measurement section 23 in the input data measurement section 22.

In this case, it is possible to know, by the first increase estimation value, which is informed by the input data measurement section 22, that the present smooth queue length, which is periodically scanned, will be increased by α−γ(=α') by n times at each Δt in the future.

Accordingly, it becomes possible to estimate a smooth queue length in the future even in the packet discarding judgment section 21, and the discarding judgment is conducted according to the estimation. That is, when the maximum threshold value to discard a packet is maxTH, the following formula is established.

$$\beta+(\alpha'\times n\_max)>maxTH \qquad (4)$$

According to the above formula, it is possible to find a receiving frequency (n_max) of the quantity of data α' by which the present smooth queue length β exceeds the threshold value in the future. Therefore, it is possible to know that the average queue length will not exceed the maximum threshold value maxTH in the period of time from the present time to the time Δt×(n_max−1). In this connection, FIG. 11B shows an example of n_max=3.

Accordingly, it is possible for the packet discarding judgment section 21 to conduct the following processing. In the time Δt×(n_max−1), the smooth queue length is not scanned, and the packet is made to pass through unconditionally. When the time Δt×(n_max−1) is over, the input packet is discarded unconditionally.

Figure 12:
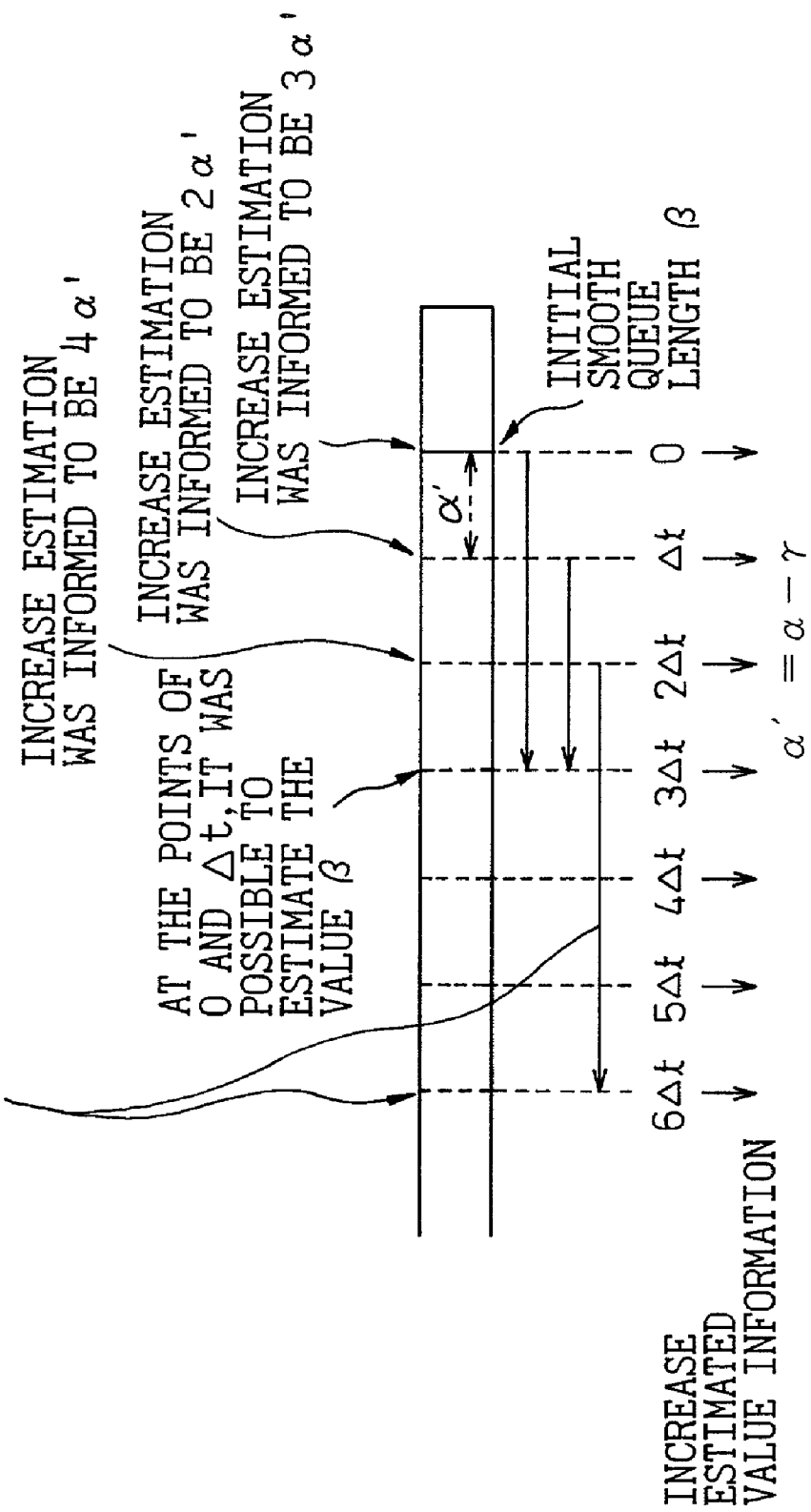
FIG. 12 is a view showing the seventh embodiment in which the estimation of the smooth queue length is used.

FIG. 12 is a view showing the seventh embodiment of the present invention.

As shown in FIG. 12, this processing is conducted as follows. As long as information of the increase estimation value from the measurement section 23 continues, this processing continues. When information of the increase estimation value from the measurement section 23 stops, scanning of the smooth queue length is started, and the program returns to the discarding judgment processing conducted by the smooth queue length at each Δt in the meantime as shown in FIG. 3.

Figure 13:
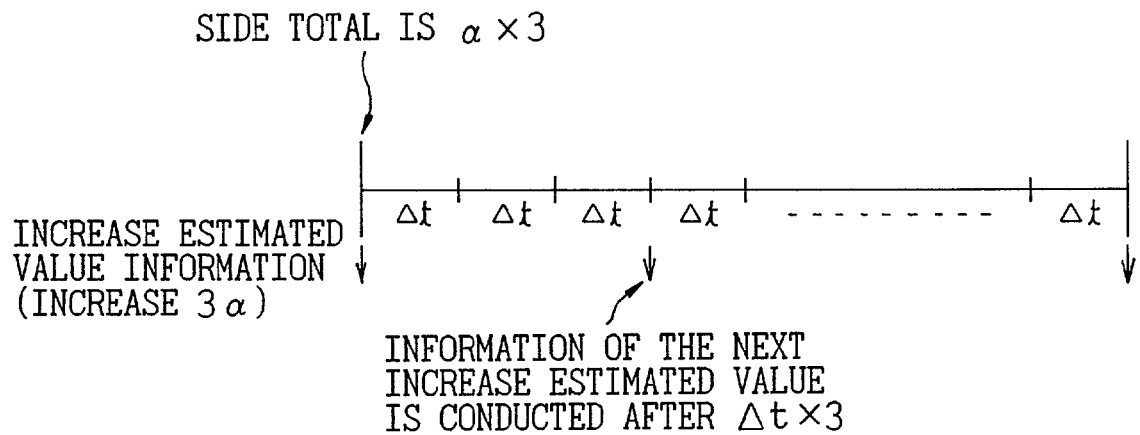
FIG. 13 is a view showing the eighth embodiment in which the estimation of the smooth queue length is used.

FIG. 13 is a view showing the eighth embodiment of the present invention.

In this case, the increase estimation value is not informed from the measurement section 23 of the input data measurement section 22 to the packet discarding judgment section 21 at each Δt, unlike the cases shown in FIGS. 11(a) and 12, but the increase estimation value is informed when the accumulation quantity is checked after the time Δt×n has passed. In the embodiment shown in FIG. 13, after the time Δt×3 has passed from the increase estimation information processing in which the increase is 3α, the next increase estimation value information processing is conducted. As a result, the load of information processing is reduced in the measurement section 23.

Figure 14:
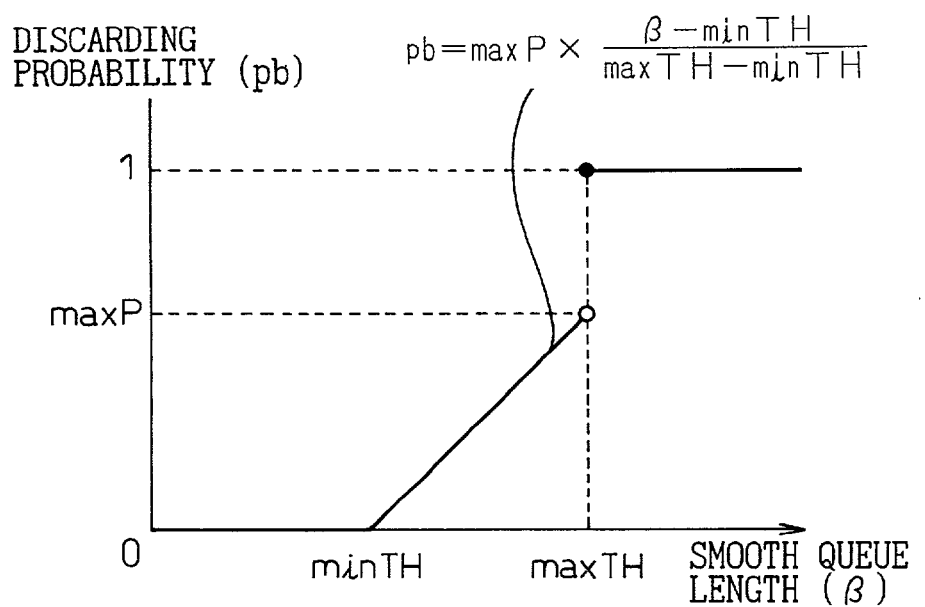
FIG. 14 is a graph showing a relation between the smooth queue length and the packet discarding probability.

FIG. 14 is a graph showing the relationship between the smooth queue length of the present invention and the packet discarding probability.

In this case, in the same manner as that the conventional RED shown in FIG. 1, concerning the packet discarding processing, not only one threshold value of the maximum threshold value (maxTH) but also two threshold values of the minimum threshold value (minTH) and the maximum threshold value (maxTH) are provided. In this embodiment, the packet discarding probability (pb) is given by the following formula (5).

$$pb=maxP\times(\beta-minTH)/(maxTH-minTH) \qquad (5)$$

The above formula (5) is equal to a formula obtained when the value avg is substituted by the value β in the above formula (2). Due to the foregoing, at the point of time when the smooth queue length β of the present invention has exceeded the minimum threshold value, the packet discarding is started. After that, the packet discarding probability is increased in proportion to the increase in the smooth queue length β. Finally, at the point of time when the smooth queue length β has exceeded the maximum threshold value, the input packets after that are completely discarded.

FIGS. 15 to 19 are views showing flow charts of operations of the congestion control unit of the present invention explained above.

Figure 15:
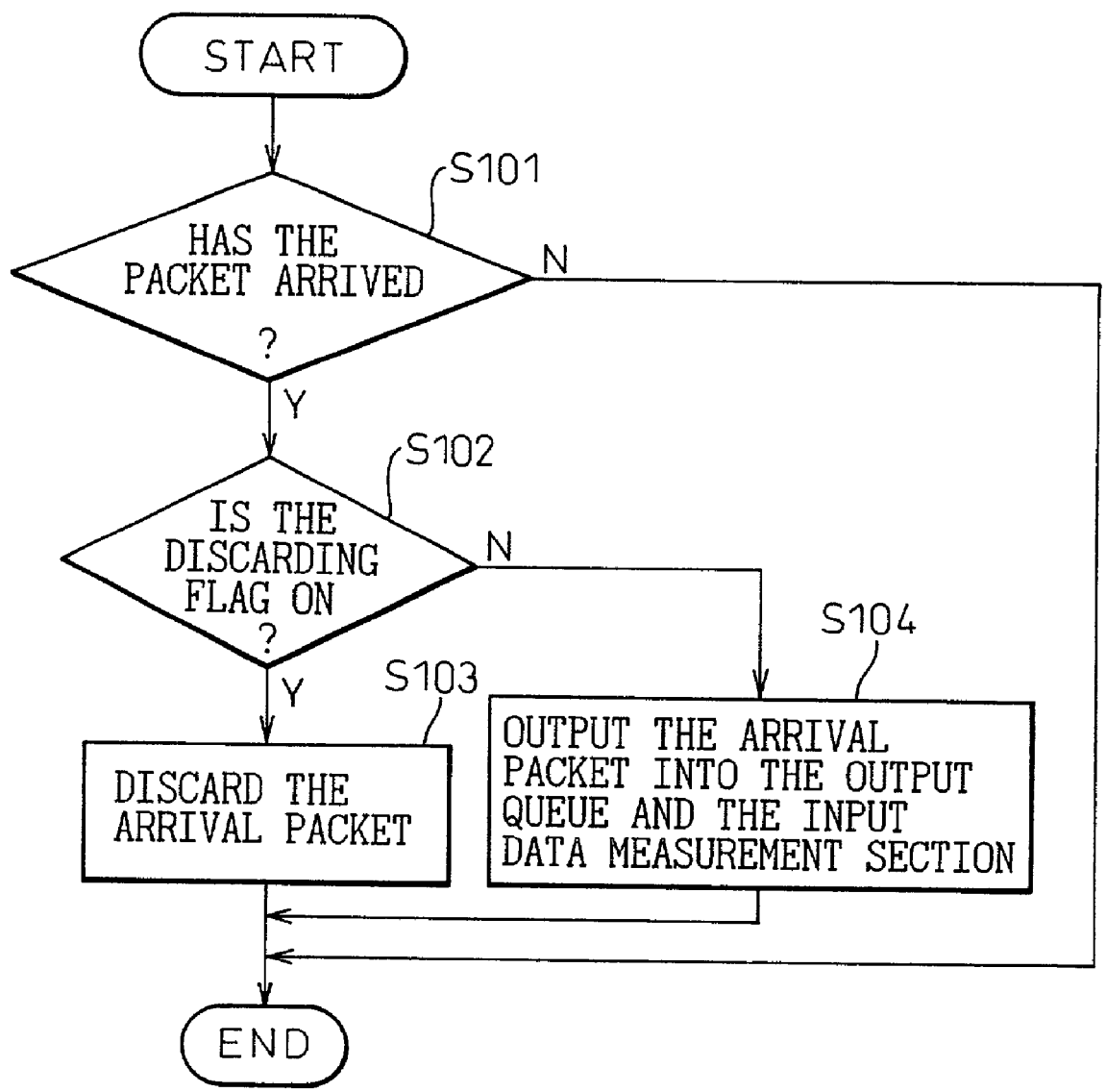
FIG. 15 is a view showing an example of the packet discarding judgment flow in the packet discarding judgment section.

FIG. 15 is a view showing an example of the packet discarding judgment flow in the packet discarding judgment section 21.

In step S101, the packet arrival is confirmed. When the discarding flag, which shows whether or not the smooth queue length (β) exceeds the maximum threshold value (maxTH), is off (β<maxTH), the arrival packet is classified and outputted into the corresponding queue $13_1$ to $13_n$ of the output queue 2 and, at the same time, is also outputted into the input data measurement section 22 (S104). In the case where the discarding flag is on (β>maxTH), the arrival packet is discarded.

Figure 16:
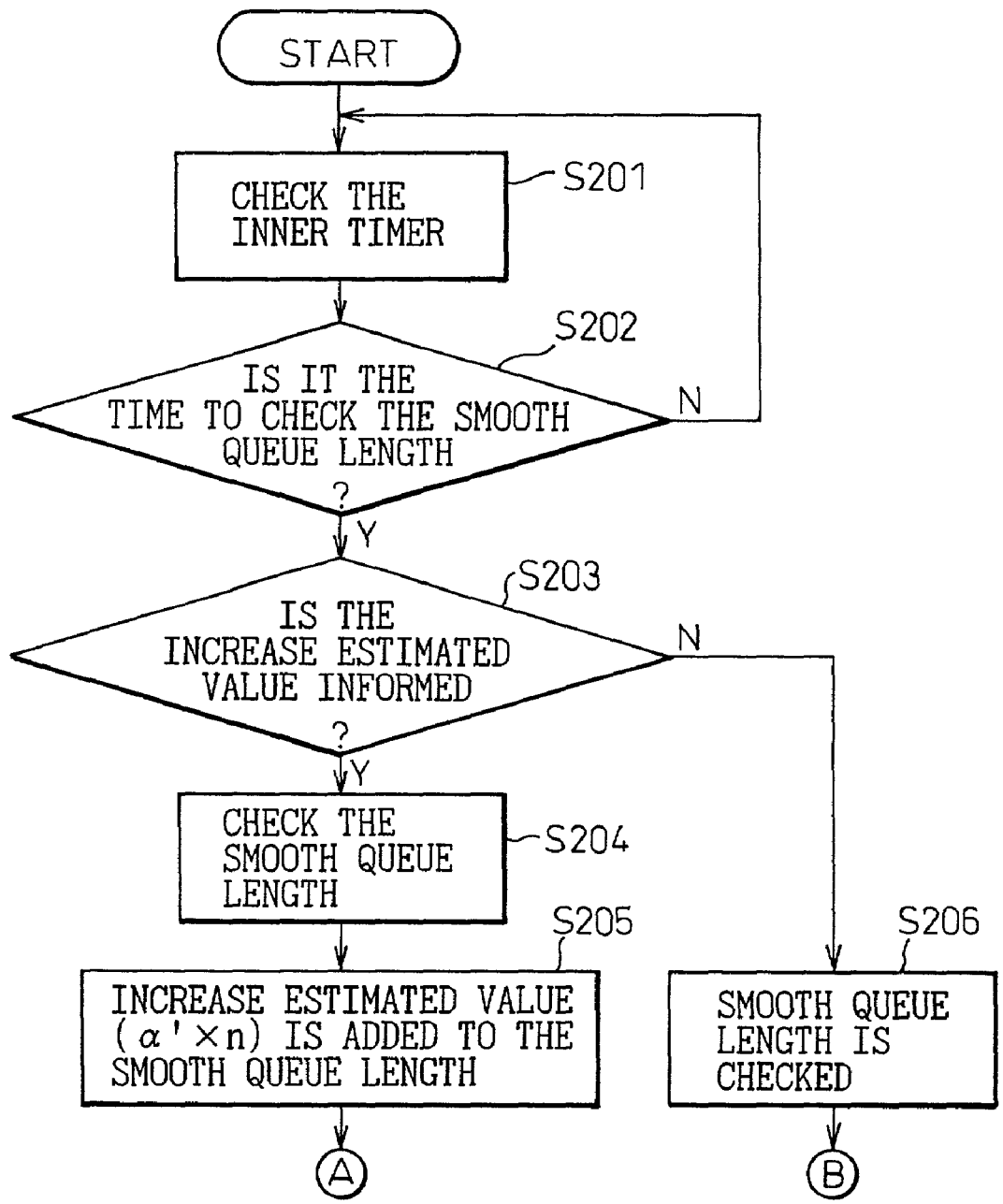
FIG. 16 is a view showing an example (1) of the smooth queue length check flow in the packet discarding judgment section.
Figure 17:
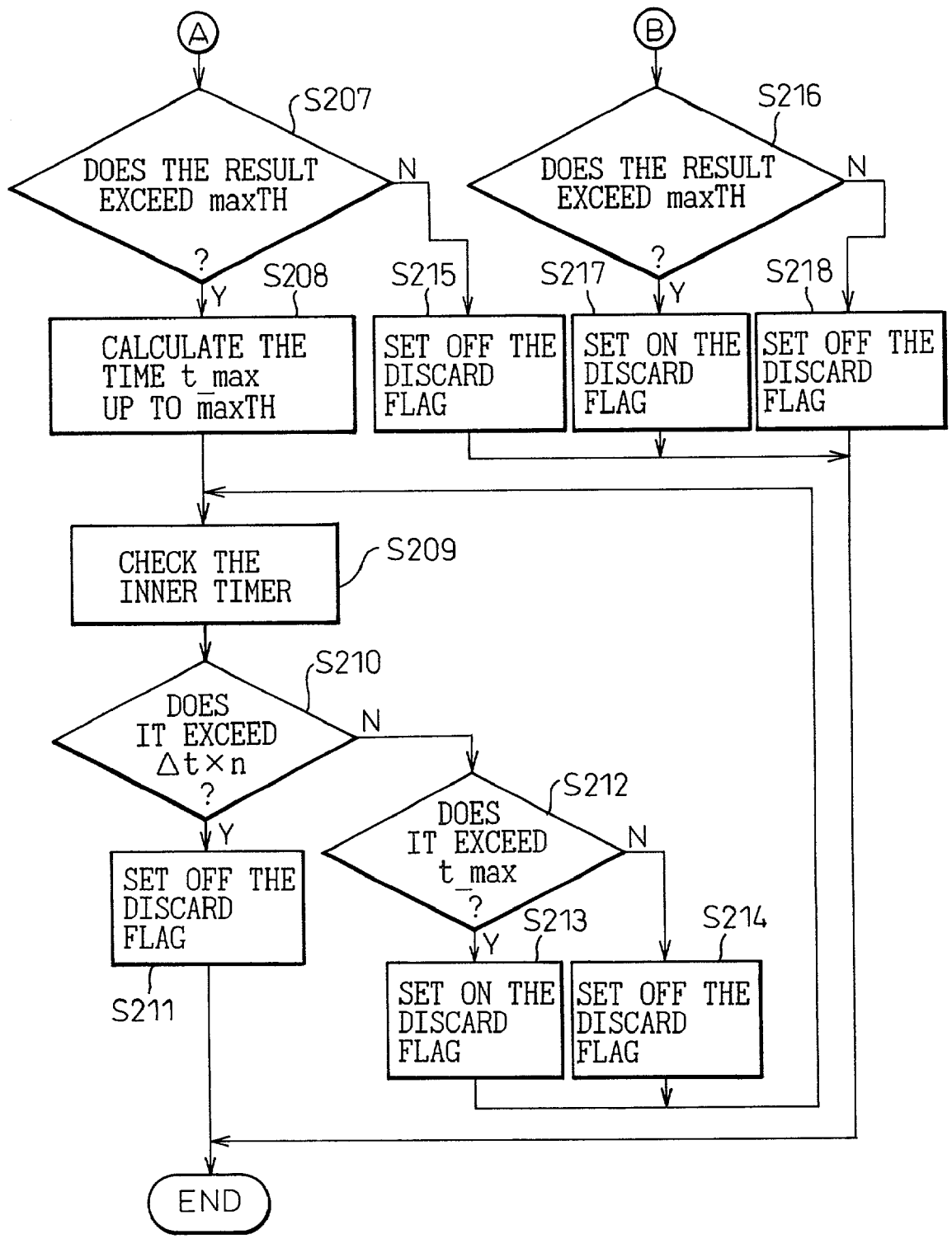
FIG. 17 is a view showing an example (2) of the smooth queue length check flow in the packet discarding judgment section.

FIGS. 16 and 17 are views showing an example of the flow chart for checking the smooth queue length in the same packet discarding judgment section 21.

First, when the smooth queue length check time at each Δt is detected by the inner timer, it is judged whether or not the increase estimation value is informed by the input data measurement section 22 (S201 to S203). When the increase estimation value is not informed, the input data measurement section 22 is scanned and the smooth queue length (β) is checked, and it is judged whether or not it exceeds the maximum threshold value (maxTH) (S206 and S207). As a result, in the case of β<maxTH, the discarding flag is set to be off. On the contrary, in the case of β>maxTH, the discarding flag is set to be on (S217 and S218).

In the case where the increase estimation value is informed, first, in the same manner as that described before, the input data measurement section 22 is scanned so that the smooth queue length is checked (S203 to S205 and S207). In the case of β<maxTH, the discarding flag is set to be off (S215). On the other hand, in the case where there is a possibility of β>maxTH, the discarding flag is not immediately set to be on, but the time tmax, which is the time to become β>maxTH, is calculated (S208).

Next, the inner timer is checked. In the case where the time Δt×n, which is an effective period of the increase estimation value informed in t_max, has passed, it is determined that the packet can be continuously received, and the discarding flag is set to be off (S209 to S211). On the other hand, when the time reaches t_max in the above period Δt×n, the discarding flag is set to be on, and the arrival packet, which arrives after that, is discarded (S212 and S213).

Figure 18:
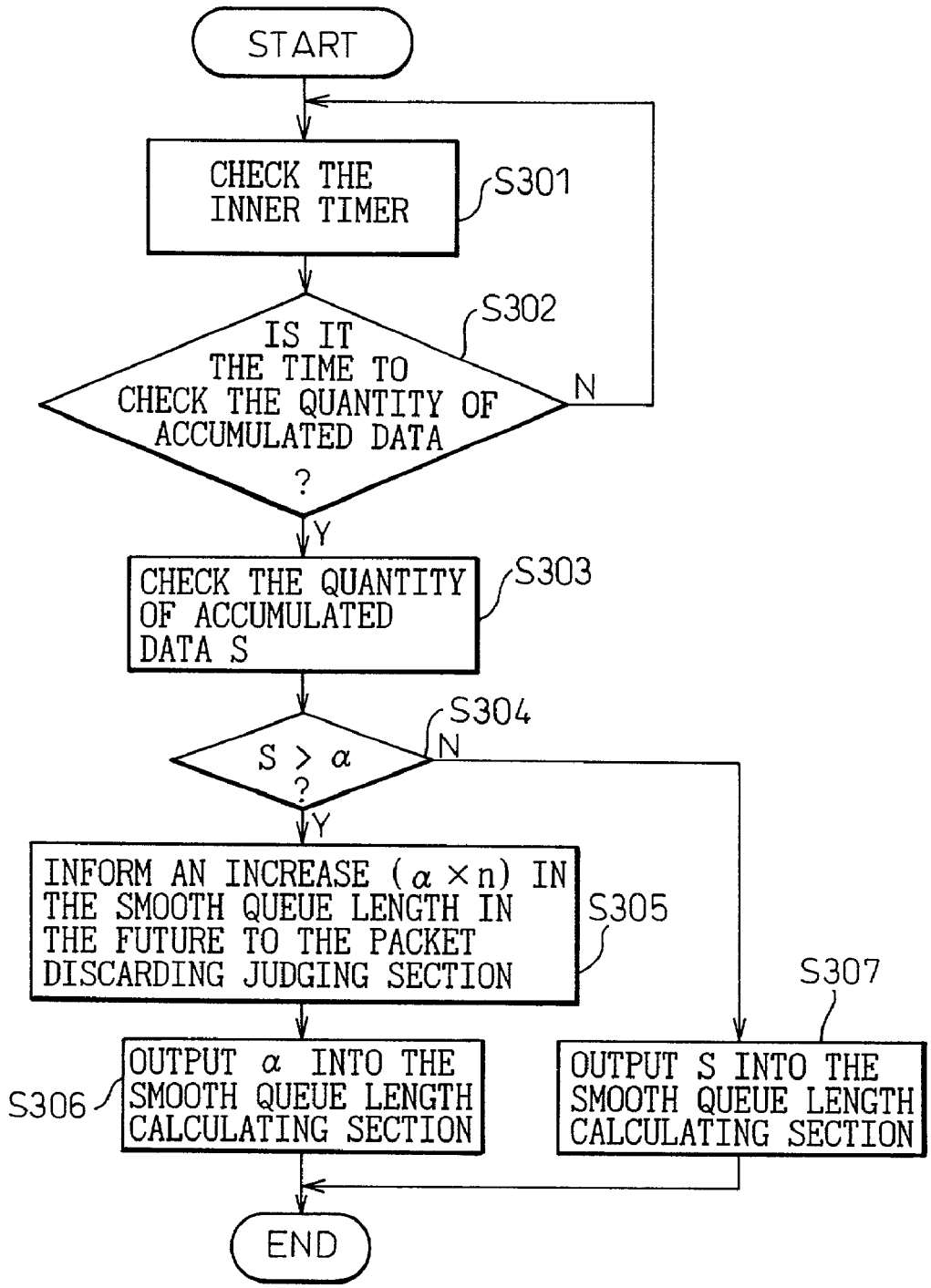
FIG. 18 is a view showing an example of the accumulated data quantity check flow in the measurement section.

FIG. 18 is a view showing an example of the flow chart for checking an accumulated quantity of data in the measurement section 23 in the input data measurement section 22.

First, when the time to check the accumulated quantity of data at each Δt is detected by the inner timer, the accumulated quantity of data S at the present point of time is checked (S301 to S303).

When the accumulated quantity of data S is smaller than the quantity of data α outputted from the measurement section 23 at each Δt (S<a), the accumulated quantity of data S is outputted into the smooth queue length calculating section 24 as it is (S304 and S307). On the contrary, when the accumulated quantity of data S is larger than the quantity of data α (S>α), after the increase (α×n) of the smooth queue length in the future is informed to the packet discarding judgment section 21, the quantity of data α is outputted into the smooth queue length calculating section 24 (S304 and S307).

Figure 19:
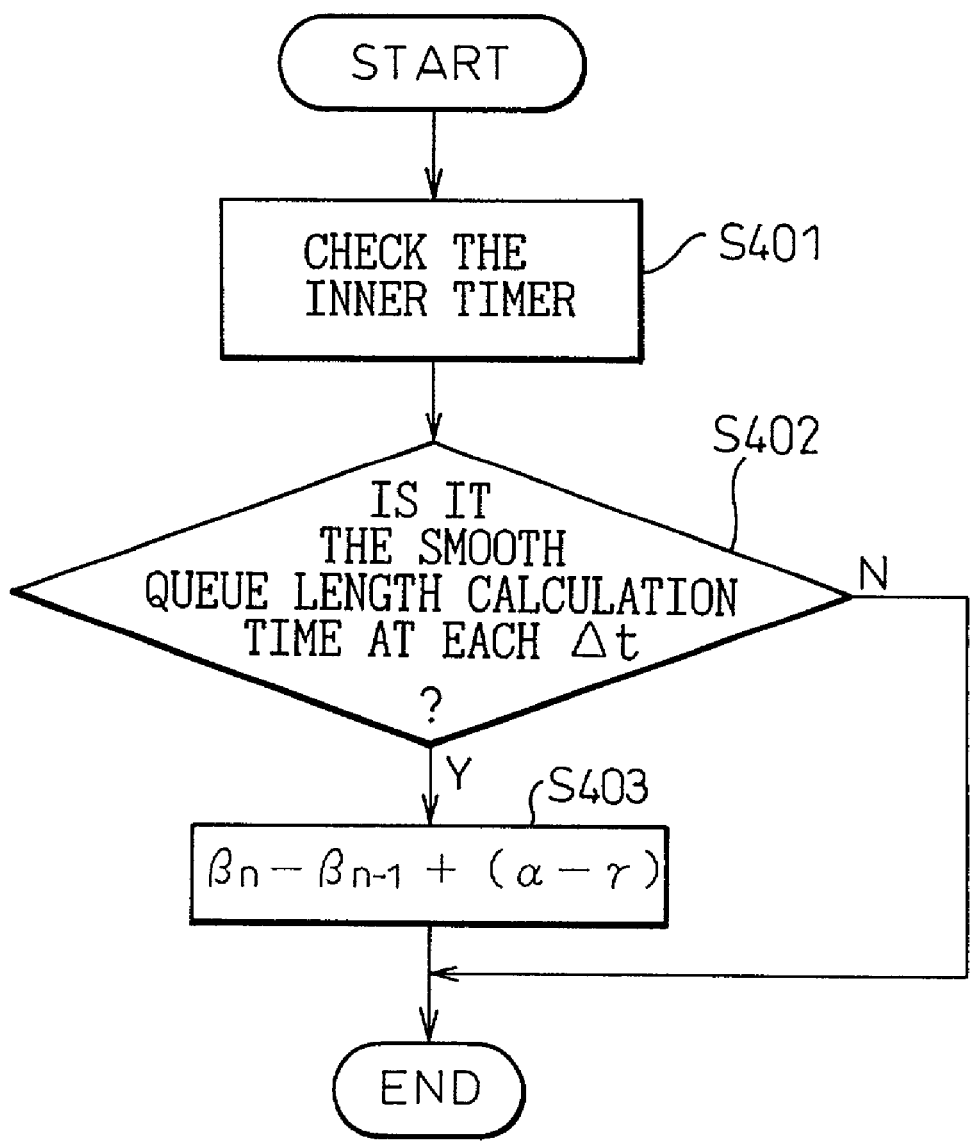
FIG. 19 is a view showing an example of the smooth queue length calculation flow in the smooth queue length calculation section.

FIG. 19 is a view showing an example of the flow chart of the smooth queue length calculation in the smooth queue length calculating section 24 in the input data calculating section 22.

In this case, the time of the smooth queue length calculation is detected at each Δt by the inner timer, and the aforementioned formula (3) of $\beta_n = \beta_{n-1} + (\alpha - \gamma)$ is calculated (S401 to S403).

As described above, according to the present invention, it is possible to provide a new congestion control unit instead of the conventional congestion control unit in which a complicated calculation is conducted for the packet discarding judgment. According to the congestion control unit of the present invention, it is possible to reduce a load of the calculation processing. Therefore, it is possible to easily apply it to an interface, the processing speed of which is high.

The invention claimed is:

1. A congestion control unit comprising:
an input data measurement section for measuring a quantity of packet data to be inputted; and
a packet discarding judgment section for conducting a discarding judgment of an arriving packet and outputting a packet not to be discarded into an output queue and the input data measurement section,
the input data measurement section including a measurement section for outputting a constant quantity of packet data, which are inputted from the packet discarding judgment section, at a predetermined period and also including a smooth queue length calculating section for accumulating data outputted from the measurement section and outputting a constant quantity of accumulated data in the predetermined period, wherein the packet discarding judgment section conducts congestion control by a packet discarding judgment based on a smooth queue length which is a quantity of accumulated data composed of a difference between a quantity of input data and a quantity of output data at each predetermined period in the smooth queue length calculating section, and
the smooth queue length calculating section includes a memory device or pointing device for calculating and displaying a quantity of accumulated data composed of a difference between the quantity of input data and the quantity of output data.

2. A congestion control unit comprising:
an input data measurement section for measuring a quantity of packet data to be inputted; and
a packet discarding judgment section for conducting a discarding judgment of an arriving packet and outputting a packet not to be discarded into an output queue and the input data measurement section,
the input data measurement section including a measurement section for outputting a constant quantity of packet data, which are inputted from the packet discarding judgment section, at a predetermined period and also including a smooth queue length calculating section for accumulating data outputted from the measurement section and outputting a constant quantity of accumulated data in the predetermined period, wherein
the packet discarding judgment section conducts congestion control by a packet discarding judgment based on a smooth queue length which is a quantity of accumulated data composed of a difference between a quantity of input data and a quantity of output data at each predetermined period in the smooth queue length calculating section, and
the input data measurement section periodically estimates a tendency of an increase in the smooth queue length, in the future, from a quantity of data accumulated in the input data measurement section, informs the packet discarding judgment section of the result of the estimation of the increase of the smooth queue length, and conducts batch processing in a period capable of being estimated, after the period capable of being estimated has passed.

3. A congestion control unit according to claim 2, wherein the packet discarding judgment section calculates the time, at which the smooth queue length exceeds a threshold value, from a quantity of the future increase in the smooth queue length which has been informed, and judges whether an arriving packet is made to pass or is discarded according to the time.

4. A congestion control unit comprising:
an input data measurement section for measuring a quantity of packet data to be inputted; and
a packet discarding judgment section for conducting a discarding judgment of an arriving packet and outputting a packet not to be discarded into an output queue and the input data measurement section,
the input data measurement section including a measurement section for outputting a constant quantity of packet data, which are inputted from the packet discarding judgment section, at a predetermined period and also including a smooth queue length calculating section for accumulating data outputted from the measurement section and outputting a constant quantity of accumulated data in the predetermined period, wherein the packet discarding judgment section conducts congestion control by a packet discarding judgment based on a smooth queue length which is a quantity of accumulated data composed of a difference between a quantity of input data and a quantity of output data at each predetermined period in the smooth queue length calculating section, and the packet discarding judgment section judges whether an arriving packet is made to pass or is discarded according to the packet discarding probability in which the smooth queue length is used as a parameter.

* * * * *